(12) United States Patent
Zanini

(10) Patent No.: US 7,451,993 B2
(45) Date of Patent: Nov. 18, 2008

(54) STEERABLE CHASSIS FOR WORK VEHICLE

(75) Inventor: Stefano Zanini, Grumolo Delle Abbadesse (IT)

(73) Assignee: C.S.F. S.R.L. (IT)

(*) Notice: Subject to any disclaimer, the term of this patent is extended or adjusted under 35 U.S.C. 154(b) by 140 days.

(21) Appl. No.: 10/549,132

(22) PCT Filed: Mar. 17, 2004

(86) PCT No.: PCT/EP2004/002756

§ 371 (c)(1),
(2), (4) Date: Dec. 27, 2005

(87) PCT Pub. No.: WO2004/083018

PCT Pub. Date: Sep. 30, 2004

(65) Prior Publication Data

US 2006/0131837 A1 Jun. 22, 2006

(30) Foreign Application Priority Data

Mar. 18, 2003 (IT) .......................... VI2003A0049

(51) Int. Cl.
*B60G 1/04* (2006.01)
(52) U.S. Cl. .............................................. 280/124.111
(58) Field of Classification Search .............. 280/6.154, 280/124.11, 492; 180/41, 235, 418
See application file for complete search history.

(56) References Cited

U.S. PATENT DOCUMENTS

| 3,159,229 | A | | 12/1964 | Thwaites |
| 4,045,050 | A | | 8/1977 | Hawk |
| 4,079,955 | A | * | 3/1978 | Thorpe et al. ................ 280/474 |
| 4,099,733 | A | * | 7/1978 | Ahonen ....................... 280/400 |
| 4,235,308 | A | * | 11/1980 | Davis .......................... 187/222 |
| 4,353,572 | A | * | 10/1982 | McCain ....................... 280/492 |
| 4,444,409 | A | * | 4/1984 | Garrison ..................... 180/235 |
| 4,512,589 | A | | 4/1985 | Ambrose et al. |
| 4,552,238 | A | * | 11/1985 | Joyce, Jr. ..................... 180/420 |
| 4,809,805 | A | | 3/1989 | Short |
| 5,180,028 | A | * | 1/1993 | Perrenoud, Jr. ............. 180/235 |
| 6,460,643 | B1 | * | 10/2002 | Degelman ................ 180/89.12 |

FOREIGN PATENT DOCUMENTS

DE  12 16 710 B  5/1966

OTHER PUBLICATIONS

Anon., "Lock mechanism for a work machine," Research Disclosure, Kenneth Mason Pub., Hampshire, GB, vol. 437, No. 1, Sep. 2000. Research Disclosure Document No. 437001 entitled "Lock Mechanism for a Work Machine" Fig. 1 and description.

\* cited by examiner

*Primary Examiner*—Paul N. Dickson
*Assistant Examiner*—Robert A. Coker
(74) *Attorney, Agent, or Firm*—R. Neil Sudol; Henry D. Coleman; William J. Sapone

(57) ABSTRACT

A steerable chassis for work vehicle, having a coupling with a hinge that has a vertical axis in order to act as a steering system and an articulation that has a horizontal axis in order to ensure greater freedom of torsional oscillation of that chassis. The chassis has a device for locking the articulation, as selected by the operator, in order to increase the torsional rigidity of the chassis when required.

7 Claims, 4 Drawing Sheets

STEERABLE CHASSIS FOR WORK VEHICLE

BACKGROUND OF THE INVENTION

The present invention relates to a steerable chassis for a work vehicle.

A steering mechanism with two steerable wheels is generally used in order to change the direction of travel of a work vehicle or of any other kind of vehicle; in most cases, the steerable wheels are the front wheels, whereas in some cases, in some work vehicles such as fork-lift trucks, cranes, et cetera, the rear wheels are used.

For some work vehicles, especially vehicles that are not too large, such as small bulldozers, cranes, excavators, fork-lift trucks et cetera, it is advantageous to use a particular steerable chassis to change the travel direction of the vehicle instead of using a steering mechanism with steerable wheels.

These vehicles have a chassis that is substantially divided into two rigid portions that have no steerable wheels: a front chassis portion, which supports the front wheel axle, and a rear chassis portion, which supports the rear wheel axle.

The front and rear chassis portions are connected by means of an articulated coupling, which in a simple embodiment is substantially constituted by a hinge that has a vertical axis, for example of the fifth-wheel type.

Steering is achieved by acting on suitable actuation members that vary the angle formed by the longitudinal axes of the two chassis portions with respect to the fulcrum constituted by the hinge from a maximum value of 180°, for straight travel, to a minimum value, to which maximum steering curvature corresponds.

Substantially, during steering, the chassis of the vehicle literally "bends" at the hinge, thus allowing the operator to change the direction of travel of the vehicle.

Since this kind of vehicle usually lacks wheel suspensions, it is particularly uncomfortable for the operator, especially when traveling over bumpy roads.

In order to increase travel comfort, therefore, it has been thought to adopt, instead of the simple articulated coupling described above, a complex coupling that includes a hinge that has a substantially vertical axis, in order to allow the vehicle to steer, combined with an articulation whose axis is substantially parallel to the longitudinal axis of the vehicle.

A degree of freedom is thus added to the relative motion of the two chassis portions, because in addition to "bending", the chassis portions are capable, by means of the articulation, of "oscillating" with respect to each other relative to an axis that is substantially parallel to the axis of the vehicle.

The axles of the front and rear wheels can thus assume a different inclination with respect to the ground, accordingly eliminating the torsional rigidity of the chassis and consequently increasing its travel comfort.

This solution is certainly advantageous for improving comfort of the vehicle during travel, but it can lead to drawbacks when the vehicle is instead stationary and is working, because it decreases its stability.

The work vehicles being considered are in fact used to lift loads of some kind by means of a suitable implement installed at the front of the vehicle, such as a fork lift in the case of a fork-lift truck, a bucket or an excavator arm in the case of an excavator, et cetera.

During lifting, if the center of gravity of the load accidentally falls outside the vertical, the oscillating motion of the two chassis portions about the articulation produced by the imbalance of weights may cause a destabilization of the vehicle that generates in certain cases a severe risk of lateral tipping of the vehicle.

OBJECTS OF THE INVENTION

The aim of the present invention is to provide a steerable chassis for a working vehicle that overcomes the drawbacks of the cited known art.

An object of the invention is to provide a steerable chassis that allows to increase the torsional rigidity and stability of the vehicle during work when the vehicle is not moving.

A further object is to provide a steerable chassis that ensures great travel comfort when the vehicle is moving.

This aim and these and other objects that will become better apparent hereinafter are achieved by a steerable chassis for working vehicle, comprising two chassis portions, respectively a front portion and a rear portion, which are mutually connected and can rotate with respect to each other about a substantially vertical axis and about a substantially horizontal axis that is parallel to the longitudinal axis of the working vehicle, the steerable chassis being characterized in that it comprises a device for locking the relative rotation of the chassis portions about the substantially horizontal rotation axis.

BRIEF DESCRIPTION OF THE DRAWINGS

Further characteristics and advantages of the invention will become better apparent from the following detailed description of preferred but not exclusive embodiments thereof, illustrated by way of non-limiting example in the accompanying drawings, wherein.

DETAILED DESCRIPTION OF PREFERRED EMBODIMENTS

Figure 1:
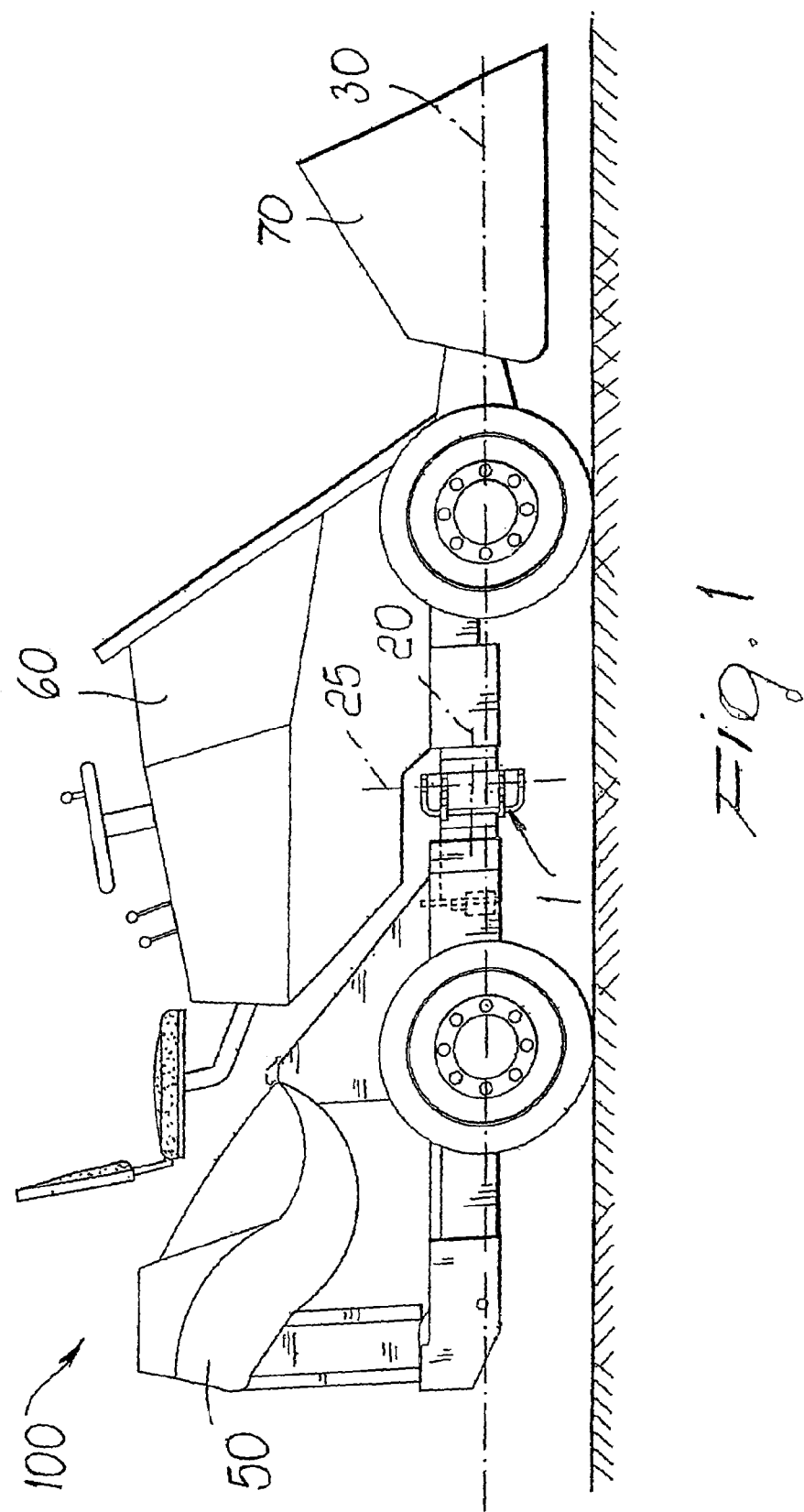
FIG. 1 is a side elevation view of a working vehicle with steerable chassis.

With reference to the cited figures, a steerable chassis for a working vehicle is generally designated by the reference numeral 100.

The chassis comprises two chassis portions, respectively a rear portion 50 and a front portion 60.

An implement 70 for lifting a load of a certain type is installed at the front of the front chassis portion 60.

The rear chassis portion 50 and the front chassis portion 60 are mutually connected centrally by virtue of a complex coupling 1, which allows the chassis portions 50 and 60 to rotate with respect to each other about a substantially vertical axis 25 and about a substantially horizontal axis 20 that is parallel to a longitudinal axis 30 of the vehicle 100.

Figure 2:
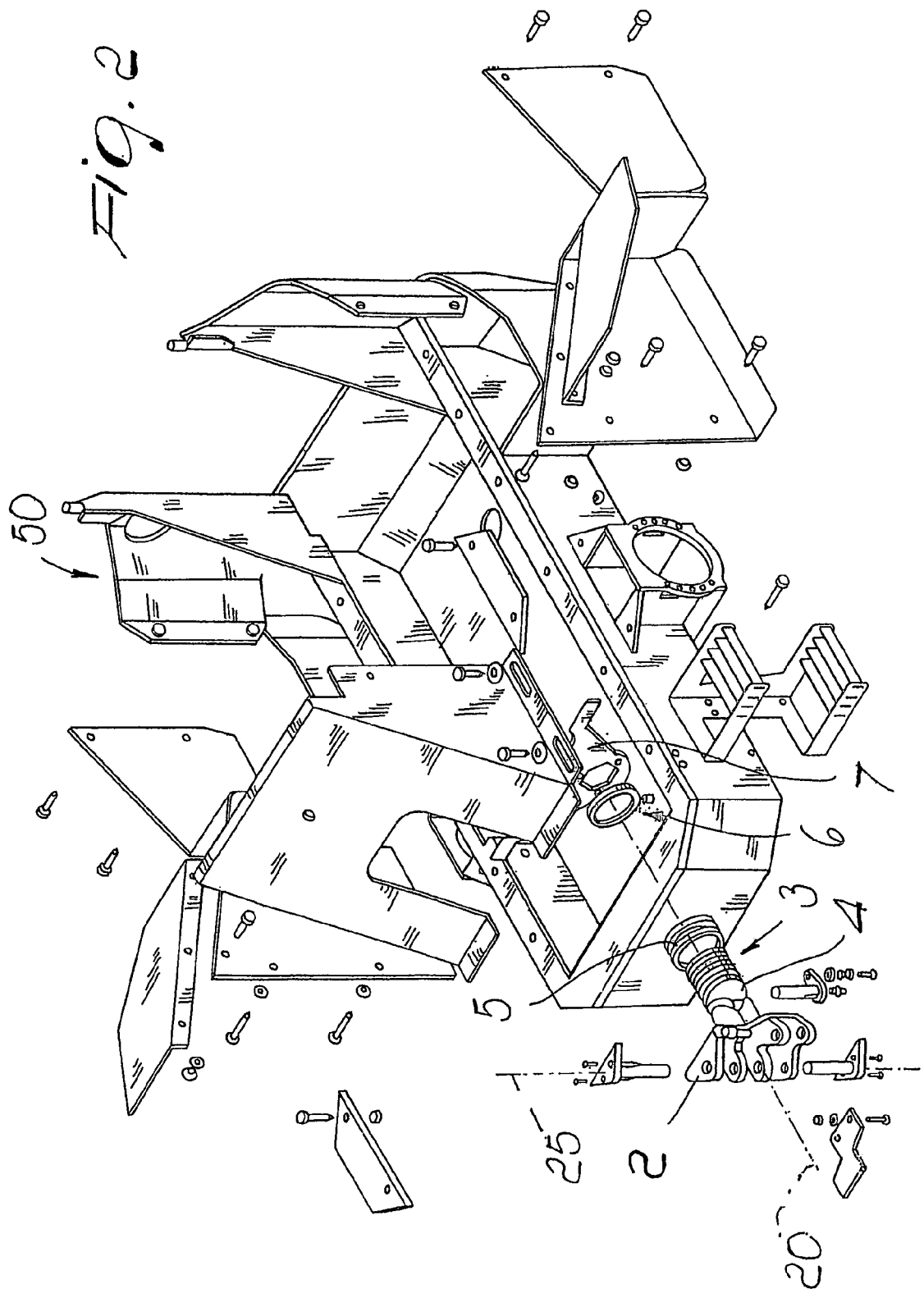
FIG. 2 is a perspective view of the rear chassis portion.
Figure 3:
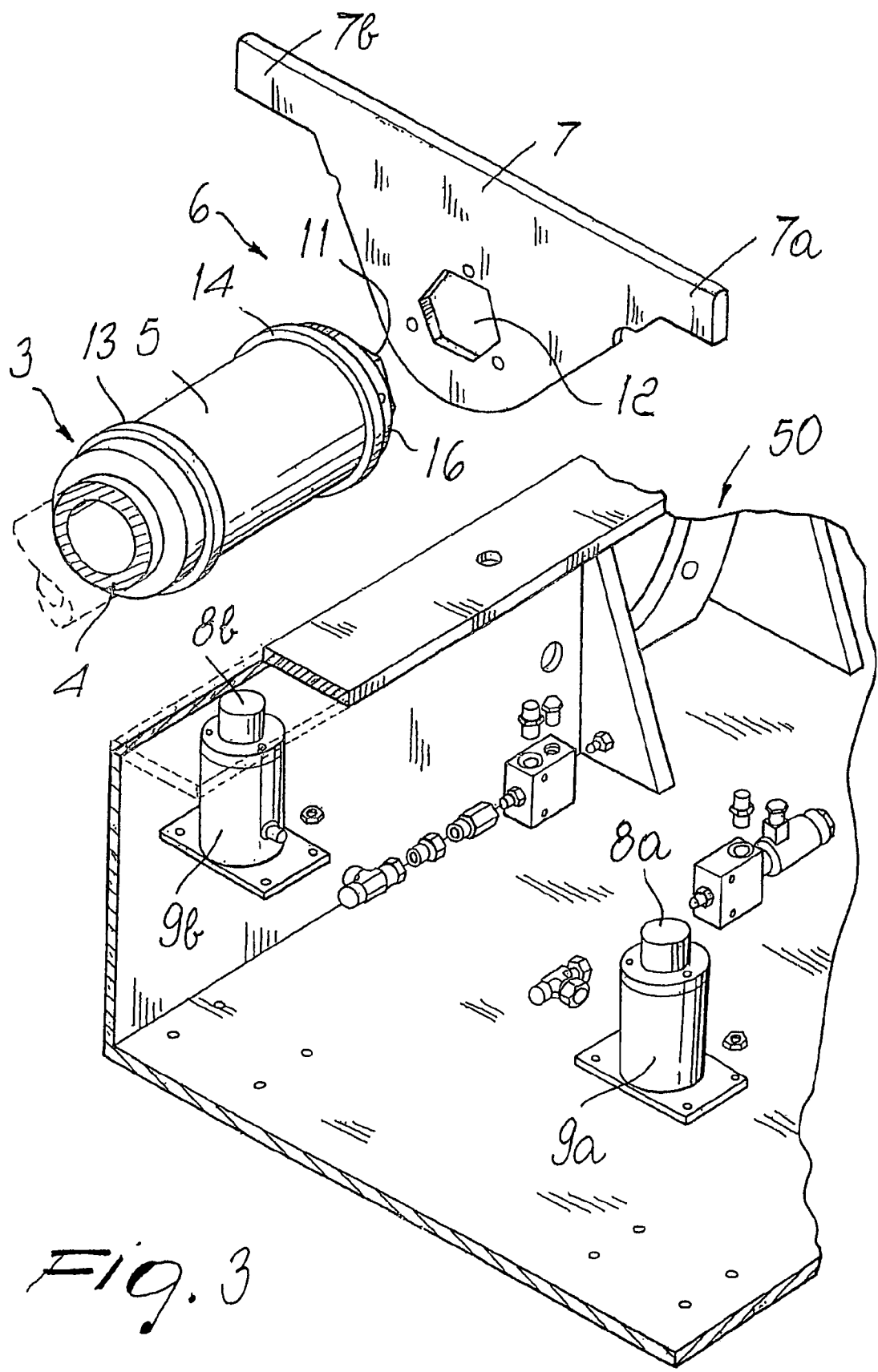
FIG. 3 is a perspective view of the articulation locking device.

As shown in FIG. 2, the coupling 1 comprises a hinge 2 that has a vertical axis 25 and provides an articulated connection between the rear chassis portion 50 and the front chassis portion 60, thus steering the work vehicle.

The coupling 1 further comprises an articulation 3, the free rotation axis of which coincides with the horizontal axis 20.

The articulation 3 is constituted by a shaft 4 that is welded to the hinge 2, and is therefore rigidly coupled to the front chassis portion 60, and by a bush 5, which is welded externally to the structure of the rear chassis portion 50 and is therefore rigidly coupled thereto.

The shaft 4 is pivoted in the bush 5 with the interposition of two antifriction bearings 13 and 14 between them.

The shaft 4 is hollow in order to reduce weight and cost of material.

Figure 4:
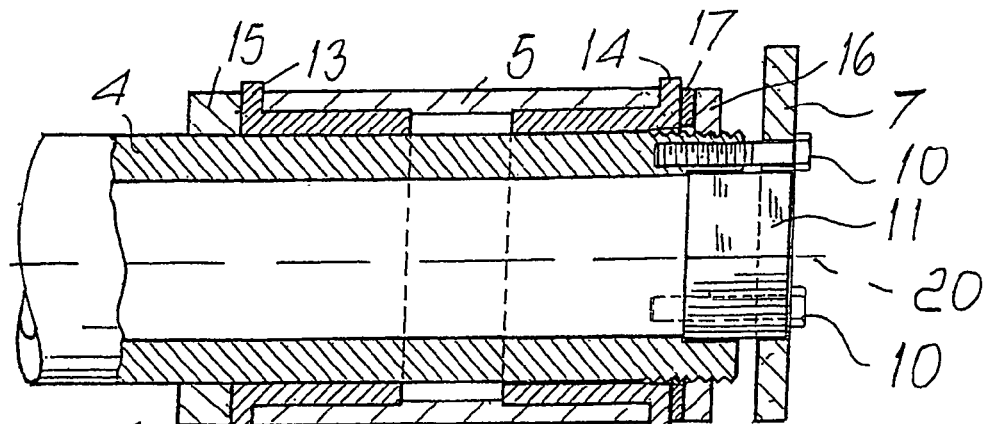
FIG. 4 is a partially sectional side elevation view of the articulation.

As shown in FIG. 4, the shaft 4 and the bearings 13 and 14 are kept in an axial position with respect to the bush 5 by a lateral containment ring 15, which is welded to one end of the shaft 4, and by a threaded ring 16 that can be screwed firmly onto a female thread that is formed on the other end of the shaft 4.

A washer 17, for preventing unscrewing, is interposed between the shoulder of the bearing 14 and the ring 16.

According to the invention, the chassis comprises a device 6 for locking the relative rotary motion of the two chassis portions 50 and 60 about the horizontal axis 20.

In practice, the device 6 acts by locking the articulation 3.

The device 6 comprises a rocker member 7, which is fixed axially to the shaft 4, and as such is rigidly coupled to the front chassis portion 60 in its oscillation with respect to the axis 20.

The rocker member 7 is fixed to the end of the shaft 4 that lies opposite the hinge 2, with the bush 5 in an intermediate position between the rocker 7 and the hinge 2.

The rocker 7 is accommodated within the structure of the rear chassis portion 50 and is therefore hidden from view.

The means for fixing the rocker member 7 to the shaft 4 consists of three stud bolts 10, which are axially screwed into the head of the shaft 4.

The shaft 4 comprises a hexagonal protruding member 11 that is coupled thereto with interference at its cavity.

In order to improve the rigidity and safety of the connection between the rocker 7 and the shaft 4, especially from a torsional standpoint, the hexagonal member 11, by protruding from the shaft 4, is accommodated in a complementary hexagonal recess 12 formed in the rocker 7.

When the operator chooses to do so, the rocker member 7 can be locked in a substantially horizontal position by virtue of a hydraulic actuation means.

Figure 5:
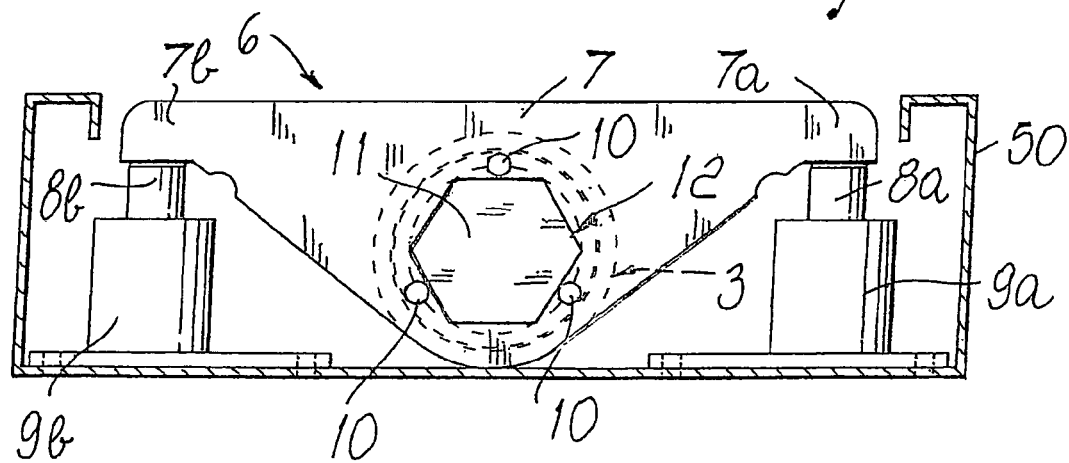
FIGS. 5 and 6 are two views of the operation of the articulation locking device.

The rocker member 7 is in fact symmetrical and includes two substantially horizontal arms, designated by the reference numerals 7a and 7b, which abut, as shown in FIG. 5, against the movable end of two hydraulic pistons, designated respectively by the reference numerals 8a and 8b, which have a substantially vertical axis, when the pistons 8a and 8b are simultaneously in the raised position.

The hydraulic cylinders 9a and 9b that correspond to the pistons 8a and 8b are fixed to the base of the rear chassis portion 50 by means of screws.

The cylinders 9a and 9b are arranged symmetrically with respect to the axis 20 and so that each one of the movable ends of the pistons 8a and 8b coincides vertically and can abut against the respective end portion of the arms 7a and 7b.

The region of contact between the pistons 8a and 8b and the arms 7a and 7b is defined by a substantially horizontal supporting surface formed in the end portions of the arms 7a and 7b.

The hydraulic cylinders 9a and 9b include a hydraulic circuit, shown in FIG. 4, by acting on which the operator is capable of pressurizing the hydraulic liquid in the cylinders, thus producing an upward thrust of equal intensity of the pistons 8a and 8b.

The elongation of the movable end of the pistons 8a and 8b is the same.

Figure 6:
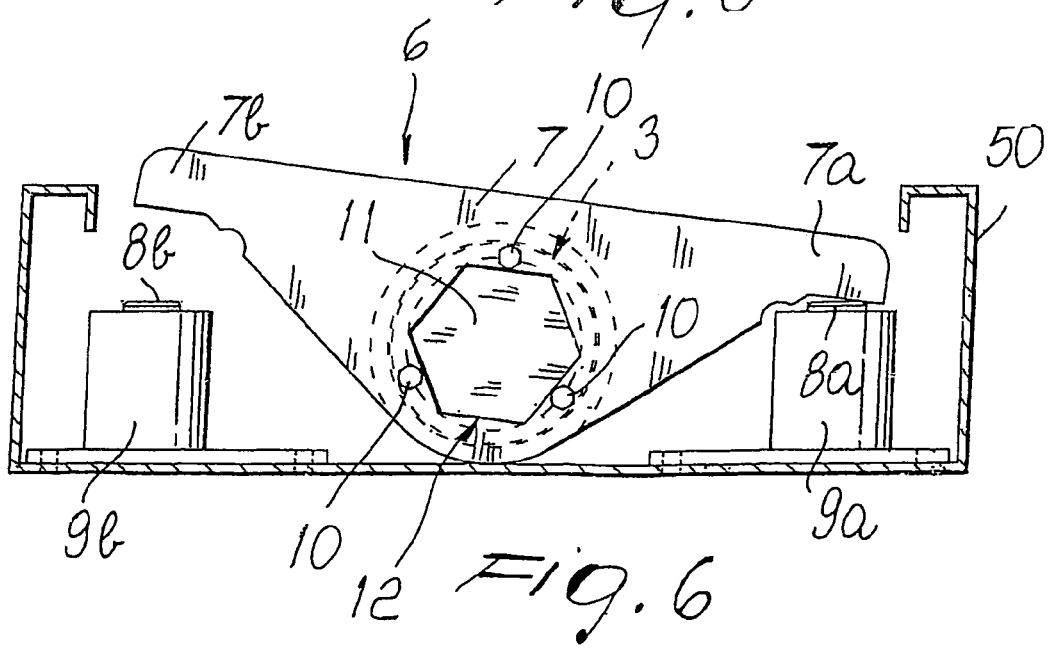

The operation of the locking device 1 is clearly shown in FIGS. 5 and 6.

In FIG. 6, the pistons 8a and 8b are not raised simultaneously, because the hydraulic liquid is not pressurized.

In this case, the rocker member 7 can assume any inclination with respect to the base of the rear chassis portion 50, and accordingly the angular oscillation about the axis 20 of the shaft 4 with respect to the bush 5 is not prevented.

Accordingly, the front chassis portion 60 and the rear chassis portion 50 can "oscillate" with respect to each other.

This is the configuration that is generally kept during travel of the vehicle in order to increase its travel comfort by way of the relative "oscillation" of the chassis portions.

FIG. 5 instead illustrates the configuration assumed by the device 6 when one wishes or needs to increase the stability of the vehicle, such as for example when it is standing still and lifting a load.

In this case, by means of a suitable control, the operator activates the simultaneous lifting of the pistons 8a and 8b against the horizontal arms 7a and 7b of the rocker 7.

The upward thrust forces produced by the pistons 8a and 8b produce two moments that act on the rocker 7 and are identical and opposite, thus forcing the rocker 7 to assume and maintain a perfectly horizontal attitude, with the rocker 7 parallel to the base of the rear chassis portion 50.

Accordingly, the "oscillation" with respect to the articulation of the two chassis S portions is prevented, accordingly increasing considerably the torsional rigidity of the steerable chassis.

In practice it has been found that the invention achieves the intended aim and objects, a steerable chassis for a working vehicle having been provided in which it is possible to increase the torsional rigidity of the chassis.

The chassis is particularly suitable for wheeled and small work vehicles, mainly having a weight of less than two tons.

The chassis according to the invention is susceptible of numerous modifications and variations, within the scope of the appended claims. All the details may be replaced with other technically equivalent elements.

The materials used, as well as the dimensions, may be any according to requirements and to the state of the art.

What is claimed is:

1. A steerable chassis for a work vehicle, comprising two chassis portions, respectively a front portion and a rear portion, which are mutually connected and can rotate with respect to each other about a substantially vertical axis and about a substantially horizontal axis that is parallel to the longitudinal axis of the working vehicle, said steerable chassis further comprising a device for locking the relative rotation of said chassis portions about said substantially horizontal rotation axis, said device comprising a rocker member and an actuation means for limiting rocking motion of said rocker member, said actuation means being an hydraulic actuation means comprising at least one hydraulic cylinder associated with a piston, said two chassis portions, respectively the front portion and the rear portion, being connected by virtue of a complex coupling that comprises a hinge, whose rotation axis coincides with said substantially vertical axis, and an articulation, whose rotation axis coincides with said substantially horizontal axis, said articulation being comprised of a shaft that is rigidly coupled to the front chassis portion and is pivoted in a bush that is rigidly coupled to the rear chassis portion, said rocker member being rigidly coupled to said shaft and being provided with two substantially horizontal arms, each of which can be abutted against a movable end of a respective hydraulic piston that has a substantially vertical axis, each said piston having a respective hydraulic cylinder that is rigidly coupled to said rear chassis portion.

2. The chassis according to claim 1, further comprising a means for coupling said rocker member to said shaft, said means consisting of stud bolts that are screwed with an axis that is parallel to the axis of said shaft.

3. The chassis according to claim 1, wherein said shaft comprises a hexagonal protruding member, which abuts in a corresponding hexagonal recess that is formed axially in said rocker.

4. The chassis according to claim 1, wherein said rocker member is symmetrical, said horizontal arms extending symmetrically and at right angles with respect to the axis of said shaft.

5. The chassis according to claim 1, wherein each one of said substantially horizontal arms comprises an end portion that is provided with a substantially horizontal supporting surface for making contact with the movable end of said corresponding hydraulic piston when said piston is in the raised position.

6. The chassis according to claim 1, wherein said pair of hydraulic cylinders, one for each of the two arms of said rocker member, are fixed to the base of said rear chassis portion by means of screws.

7. The chassis according to claim 1, wherein the movable end of each one of said pistons has the same elongation.

* * * * *